UNITED STATES PATENT OFFICE.

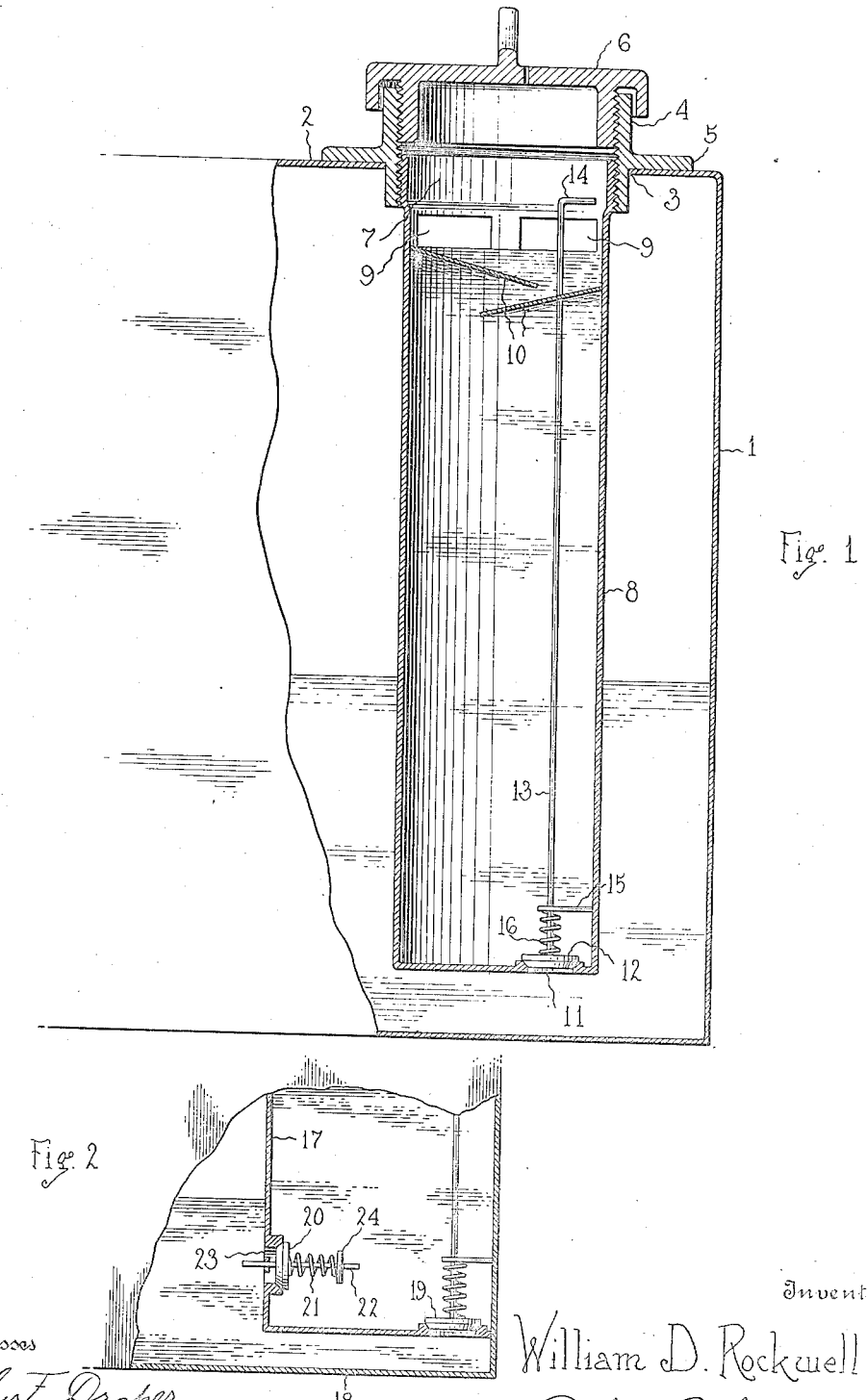

WILLIAM D. ROCKWELL, OF DETROIT, MICHIGAN.

FUEL-RESERVE TANK.

1,248,403.

Specification of Letters Patent.   Patented Nov. 27, 1917.

Application filed June 22, 1917.   Serial No. 176,239.

*To all whom it may concern:*

Be it known that I, WILLIAM D. ROCKWELL, a citizen of the United States of America, residing at Detroit, in the county of Wayne and State of Michigan, have invented certain new and useful Improvements in Fuel-Reserve Tanks, of which the following is a specification, reference being had therein to the accompanying drawings.

This invention relates to a fuel reserve tank, and has special reference to the fuel supply system of automobiles, motor trucks and similar vehicles, utilizing a liquid fuel, as gasolene in connection with an explosive engine, as a power plant.

My invention aims, in its broadest aspects to provide the main fuel supply tank of an automobile with an auxiliary or reserve tank or receptacle, which must be necessarily filled in advance of the main fuel supply tank, always insuring a reserve of fuel for emergency purposes. It is in this connection that it is impossible for the operator of an automobile to fill the main fuel supply tank and neglect to fill the auxiliary tank or receptacle, and by providing an auxiliary or reserve supply of fuel, the operator of the automobile is relieved of watchfulness when the supply of fuel is about to be exhausted.

To these and other ends, my invention includes an auxiliary tank or reserve receptacle that can be mounted in the filling connection of the main tank and filled in advance of said main tank, or the auxiliary tank or reserve receptacle may be made a part of the main tank to be filled therefrom. In either form of my invention, an automobile operator is relieved of considerable anxiety as to a supply of fuel for emergency purposes, and either form of the invention may be used with the present known systems of feeding gasolene to a carbureter or engine.

My invention will be hereinafter specifically described and then claimed, and reference will now be had to the drawing, wherein—

Figure 1 is a side elevation of a portion of a main fuel supply tank, partly broken away and partly in section, showing the preferred form of auxiliary tank, and Fig. 2 is a similar view, illustrating a modified form of auxiliary tank.

In the drawing, the reference numeral 1 denotes a portion of the main fuel supply tank and this tank has the top wall 2 thereof provided with an opening 3 in which is mounted a filling connection 4 having a peripheral flange 5 welded or otherwise secured to the top wall 2. The filling connection 4 has the inner walls thereof screw-threaded so that a conventional cap 6 may be attached to the connection 4 to close the same, said cap having the usual vent opening.

Mounted in the filling connection 4 is the upper exteriorly threaded end 7 of an auxiliary tank 8, said tank being cylindrical and extending into proximity to the bottom of the main tank 1. The side walls of the auxiliary tank 8, at the upper end thereof, are provided with openings 9 and adjacent said openings are angularly disposed baffle members 10.

The bottom of the auxiliary tank has an outlet opening 11 normally closed by an inward opening valve 12 on the end of the rod 13 that extends upwardly through one of the baffle members 10 and terminates in a crank or suitable handle 14 in the upper end of the auxiliary tank. The rod 13 also extends through a guide 15 carried by the side wall of the tank 8, and encircling said rod between the guide 15 and the valve 12, is a coiled compression spring 16, the expansive force of which holds the valve 12 normally seated to close the opening 11.

When the cap or closure 6 is removed, gasolene or other liquid fuel can be poured into the auxiliary tank 8 and as this tank becomes filled, it will overflow with gasolene or liquid fuel passing through the openings 9 into the main tank 1, which may be completely or partially filled. When the operator of an automobile finds the supply of gasolene in the main tank 1 is exhausted or dangerously low, then by removing the cap or closure 6 and raising the rod 13, the valve 12 will be opened allowing the contents of the auxiliary tank 8 to flow into the main tank and replenish the supply. The capacity of the auxiliary tank is such that there will be sufficient gasolene or liquid fuel to supply the power plant of an automobile until a service station can be reached.

In Fig. 2 of the drawing, there is illustrated a modification of my invention, wherein an auxiliary tank 17 is carried by a side wall of a main tank 18, and the auxiliary tank 17 need not be a part of the filling connection of the main tank 18. The auxiliary tank 17, besides having a spring pressed normally closed bottom valve 19, has a spring pressed normally closed side valve 20 and as the main tank 18 is filled the valve 20 is opened by pressure of fuel in the main tank so that the auxiliary tank 17 will be filled with gasolene from the main tank 18. After the auxiliary tank 17 is filled, valve 20 is closed by the pressure of gasolene within the auxiliary tank and by the expansive force of a spring 21 associated with said valve. The contents of the main tank 18 can therefore be used independently of the contents of the auxiliary tank 17, and for emergency purposes, the contents of the auxiliary tank can be released to enter the main tank by manually opening the valve 19.

In this modified form of construction, the side valve 20 is slidable on a stem 22 carried by a spider in the inlet opening 23 of the auxiliary tank and said stem has a cross head 24 with the spring 21 interposed between the valve and the cross head.

From the foregoing, it will be observed that I have devised novel means within the main tank for reserving a supply of fuel for emergency purposes, and while in the drawings there are illustrated the preferred embodiments of my invention, it is to be understood that the structural elements are susceptible to such changes, in size, shape and manner of assemblage, as fall within the scope of the appended claim.

What I claim is:—

The combination with a main fuel supply tank, of an auxiliary tank therein adapted to hold a reserve quantity of fuel, said auxiliary tank having the upper end thereof provided with overflow openings into said tank and the bottom thereof provided with an opening, an inwardly opening valve normally closing the opening of said auxiliary tank, baffle members in the upper end of said auxiliary tank adjacent the overflow opening thereof, a rod attached to said valve and extending upwardly in said auxiliary tank through one of said baffle members and adapted to be manually elevated to raise said valve, a guide for said rod, and a spring interposed between said guide and said valve adapted to hold said valve normally closed.

In testimony whereof I affix my signature in the presence of two witnesses.

WILLIAM D. ROCKWELL.

Witnesses:
OTTO F. BARTHEL,
ANNA M. DORR.